(12) United States Patent (10) Patent No.: US 8,554,080 B2
Hajduczenia et al. (45) Date of Patent: Oct. 8, 2013

(54) FAILSAFE OPTICAL SPLITTER AND METHOD TO ISOLATE FAULTS IN A PASSIVE OPTICAL NETWORK

(75) Inventors: Marek Hajduczenia, Fiaes (PT); Pedro Inacio, Aldeia de Carvalho (PT); Paulo Miguel Monteiro, Ilhavo (PT); Silvia Pato, Lisbon (PT); Henrique Silva, Coimbra (PT)

(73) Assignee: Nokia Siemens Networks OY, Espoo (FI)

( * ) Notice: Subject to any disclaimer, the term of this patent is extended or adjusted under 35 U.S.C. 154(b) by 427 days.

(21) Appl. No.: 12/679,338

(22) PCT Filed: Sep. 18, 2008

(86) PCT No.: PCT/EP2008/062422
§ 371 (c)(1),
(2), (4) Date: Nov. 22, 2010

(87) PCT Pub. No.: WO2009/037300
PCT Pub. Date: Mar. 26, 2009

(65) Prior Publication Data
US 2011/0069955 A1 Mar. 24, 2011

(30) Foreign Application Priority Data
Sep. 21, 2007 (EP) .................................. 07018630

(51) Int. Cl.
*H04J 14/00* (2006.01)
(52) U.S. Cl.
USPC .......... 398/72; 398/33; 398/10; 398/2; 398/3; 398/17; 398/45; 398/38; 398/31; 398/68; 370/352; 370/392; 370/389; 370/468

(58) Field of Classification Search
USPC ................... 385/16, 24; 398/4, 16–24, 3, 45, 398/66, 79, 1, 2, 5, 48, 67, 68, 69, 70, 71, 398/72, 98, 99, 100, 33, 38, 10, 12, 13, 30, 398/31, 32, 7, 8; 370/352, 389, 468, 392, 370/401, 254, 465, 432, 395.51
See application file for complete search history.

(56) References Cited

U.S. PATENT DOCUMENTS

| 5,778,116 A | 7/1998 | Tomich |
| 5,864,414 A | 1/1999 | Barnsley et al. |

(Continued)

FOREIGN PATENT DOCUMENTS

| EP | 1376918 B1 | 8/2005 |
| JP | 5167470 A | 7/1993 |
| JP | 9045298 A | 2/1997 |
| JP | 10150415 A | 6/1998 |
| JP | 11098078 A | 4/1999 |

OTHER PUBLICATIONS

Enomoto Y et al Optical Society of America / Institute of Electrical and Electronics Engineers: "Over 31.5 dB dynamic range optical fiber line testing system with optical fiber fault isolation function for 32-branched PON" Optical Fiber Communication Conference (OFC). Postconference Digest. Atlanta, GA, March 23-28, 2003, Trends in Optics and Photonics Series. (TOPS), Washington, DC, USA, vol. TOPS. Vol. 86, Mar. 23, 2003, pp. 608-609,XP010680386 ISBN: 1-55752-746-6.

*Primary Examiner* — Hanh Phan
(74) *Attorney, Agent, or Firm* — Laurence A. Greenberg; Werner H. Stemer; Ralph E. Locher

(57) ABSTRACT

An optical splitter for a passive optical network for telecommunication signal transmission with an optical line terminal includes a wavelength selective optical electrical converter, an AC/DC splitter, an energy reservoir and optical switches, where the splitter comprises also a data transmission processing module by which the optical switches can be controlled according to data signals transmitted from the optical line terminal.

13 Claims, 2 Drawing Sheets

(56) References Cited

U.S. PATENT DOCUMENTS

| | | |
|---|---|---|
| 5,936,753 A | 8/1999 | Ishikawa |
| 6,925,219 B2* | 8/2005 | Pfeiffer .......................... 385/16 |
| RE41,694 E * | 9/2010 | He et al. ..................... 427/248.1 |
| 2003/0235363 A1 | 12/2003 | Pfeiffer |
| 2004/0156635 A1* | 8/2004 | Felske et al. .................... 398/66 |
| 2009/0074019 A1* | 3/2009 | Wong et al. ..................... 372/26 |
| 2012/0207477 A1* | 8/2012 | Takeguchi et al. .............. 398/79 |

\* cited by examiner

FAILSAFE OPTICAL SPLITTER AND METHOD TO ISOLATE FAULTS IN A PASSIVE OPTICAL NETWORK

CROSS REFERENCE TO RELATED APPLICATIONS

This application claims the benefit of the filing date of European Patent Application No. 07018630.9 filed 21 Sep. 2007, the disclosures of which are hereby incorporated herein by reference.

FIELD OF THE INVENTION

The invention is related to an optical splitter for a passive optical network for telecommunication signal transmission with an optical line terminal, comprising a wavelength selective optical electrical converter, an AC/DC splitter, an energy reservoir circuitry and optical switches and a method to sever and reconnect optical lines to such an optical splitter.

TECHNOLOGICAL BACKGROUND

Passive optical networks are low cost access networks that provide elements to deliver telecommunication signals from a central office via an Optical Line Terminal OLT to subscribers near Optical Network Units ONU. The direction from the central office to the subscribers is called downstream while the reverse direction is called upstream. Since a single OLT is connected to several ONUs through a complete passive optical infrastructure, the downstream communication is of the broadcast type, which means that all ONUs connected to the OLT receive the same signal emitted by the OLT. Upstream communication is of the point to point type, as all signals from the ONUs are merely combined together in the splitters. This requires channel sharing, which is usually done by a time division multiplexing mechanism.

Under normal circumstances, an ONU transmits data during a previously assigned time slot. Correct decoding of signals can be compromised when two or more signals collide and arrive superimposed at the OLT. Such a situation can occur when there is a failure in the ONU and it starts transmission of data outside the assigned time slot. This can leave the entire optical network under a severe denial of service condition.

Until now once a faulty ONU was identified, a technician would have been sent to its location, in order to physically disconnect it. During this procedure the network remain unavailable, leading to network downtime.

In the European Patent EP 1 376 918 B1 a passive optical network is disclosed, which uses auxiliary optical lines and where a bistable optical switch in the splitter connects to the auxiliary optical line, if the signal on the main optical line is faulty or the optical line is broken. The electronic circuitry for controlling the bistable switch is powered by an optical signal, which has a wavelength outside the range for the use by the telecommunication signals. The bistable switch is activated, if the signal on the main optical line is below a predefined threshold.

SUMMARY OF THE INVENTION

A network constructed according to the document cited above may require a lot of additional optical lines and may not be able to follow an isolation strategy, carried out in the control system.

There may be a need for a splitter in a completely passive optical network and a method to isolate faulty ONUs without additional optical or electrical lines.

This may be achieved by the splitter as claimed and the method as claimed.

Embodiments of the invention are shown in the dependent claims.

The passive optical network can be of any type, e.g. the tree type or the star type, where multiple ONUs are connected to one OLT. The optical signal transmission may be divided upstream and downstream in different wavelengths, where a range of wavelengths is allocated for telecommunications use. The ONUs may share one wavelength for the upstream direction and transmit in previous assigned timeslots. If one or more of the ONUs transmit in non assigned time slots, a severe denial of service condition can occur and the faulty ONU may be isolated. This may be done by severing the faulty ONU from the network by an optical switch in the last splitter, to which the faulty ONU is connected. To control the switch in the splitter, data signals may be transmitted from the OLT to the splitters and these data signals are processed by a data transmission processing module in the splitter.

The data transmission processing module may be an electronic circuit that is energized by an optical power signal, transmitted by the control system. This optical power signal may use a wavelength outside the range of the telecommunication signals. The power signal may be received by an optical electrical converter, usually a photodiode, which is wavelength selective. The energy out of the optical electrical converter may be stored in an energy reservoir, which may be a capacitor array, a battery pack or a rechargeable battery, or any other electric or electronic device set-up capable of storing electrical charge for delayed utilization.

An electrical AC/DC-splitter may split the DC component from the received power signal and may feed it to the energy reservoir.

The AC component of the power signal may be delivered to the data transmission processing module.

In the data transmission processing module may be included: a switch control circuitry, a power level control circuitry and a data transmission circuit.

The power level control circuitry may monitor the data from the optical line terminal and may power down the switch control circuitry and the data transmission circuitry, if no data signals are present.

The optical switches may be preferably bistable switches, which consume power only during the switching process. So the electrical energy used by a splitter can be minimised. A suitable switch may be a switch with a liquid crystal, which changes the polarity of the passing light.

Another suitable switch may be a switch made in MEMS technology with mirrors, which can deflect the light beam to the on or off state. Instead of the mirrors also diffractive strips may be used, which are raised or lowered to attenuate the light signal. The bistable function of such devices may be realized by a bistable suspension mechanism that keeps the last selected state after power off.

The MEMS technology allows to build all-optical components. Such devices may be composed of an optical switch part and an electrical driver interface.

The method to sever and reconnect optical lines to an optical splitter may use a downstream power signal with a wavelength out of the range used by the telecommunications transmission. This power signal may be distributed downstream to all splitters. The switching part of each splitter may stay inactive during normal system operation, only collecting energy in the energy reservoir.

When the OLT detects a faulty condition in the upstream signal, a software agent in the control system may identify the faulty ONU by severing and reconnecting the optical lines from the splitters to the ONUs. This may be done by transmitting data signals in the power signal, which may be analysed by the data transmission circuit and which may operate the switching circuitry and thus sever and reconnect the optical lines. The OLT may monitor the upstream signal and when the faulty signal disappears, the faulty ONU has been isolated and the normal system operation can proceed. Now the faulty ONU can be exchanged. When a functional ONU is installed, the optical line to it can be reconnected.

In normal system operation the electronic circuitry in the splitter may be powered down. To allow a wake up procedure in the splitters, the data signal may start with a long preamble phase. This gives the necessary time to the splitters to wake up and analyse the data signal correctly.

The described architecture may provide an active counter measure against faults of the ONUs on the physical layer, minimizing the network downtime and facilitating discovery and isolation of faulty sources and allowing for their remote disconnection from the passive optical network structure.

This may be achieved in a true all-optical network structure, without auxiliary optical lines or electrical cables. The application of power down functions minimizes the power dissipation in the splitters and allows the use of an optical power signal as a power source for the switching functions. As the power signal is out of the range of the telecommunication transmission signals, the system may be compatible with existing passive optical network systems.

The data signal used to control the switches in the splitters can be further extended to support future extensions. The required changes on existing networks can be limited to the OLT and the splitters. All ONUs may remain the same and may be unaware of the hardware upgrade.

The optical power source used to feed the power signal onto the optical lines can be an integrated part of the OLT or can be implemented as a stand alone module, thereby enhancing the backward compatibility of the proposed solution.

BRIEF DESCRIPTION OF THE DRAWINGS

The figures depict the preferred embodiment of the invention.

DETAILED DESCRIPTION OF EXEMPLARY EMBODIMENTS

Figure 1:
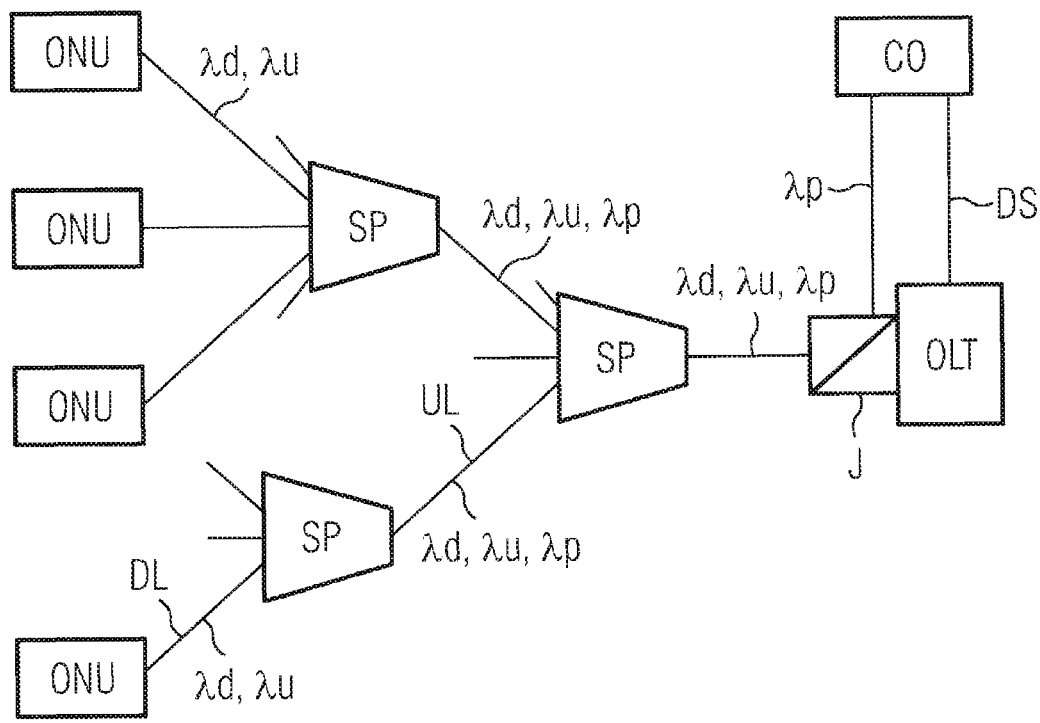
FIG. 1 shows the network structure.

The optical network in a tree configuration is shown in FIG. 1. The Optical Network Units ONU of the subscribers are connected to the Splitters SP via an optical line. The splitters are connected to the Optical Line Terminal OLT, which may be controlled from the Control system CO by control signals CS.

The optical lines from the splitter SP directed to the ONU are the downstream line DL, the opposite optical line in direction to the OLT is the upstream line UL.

On the optical lines the communication may be split in upstream and downstream signals, which may be transmitted by the upstream wavelength $\lambda u$ and the downstream wavelength $\lambda d$.

The control system CO also generates the power signal, which may be injected into the optical line at the optical line terminal OLT by the junction J. It has a wavelength $\lambda p$ outside the range of the upstream and downstream signals. So may be can be easily detected by the splitters.

Figure 2:
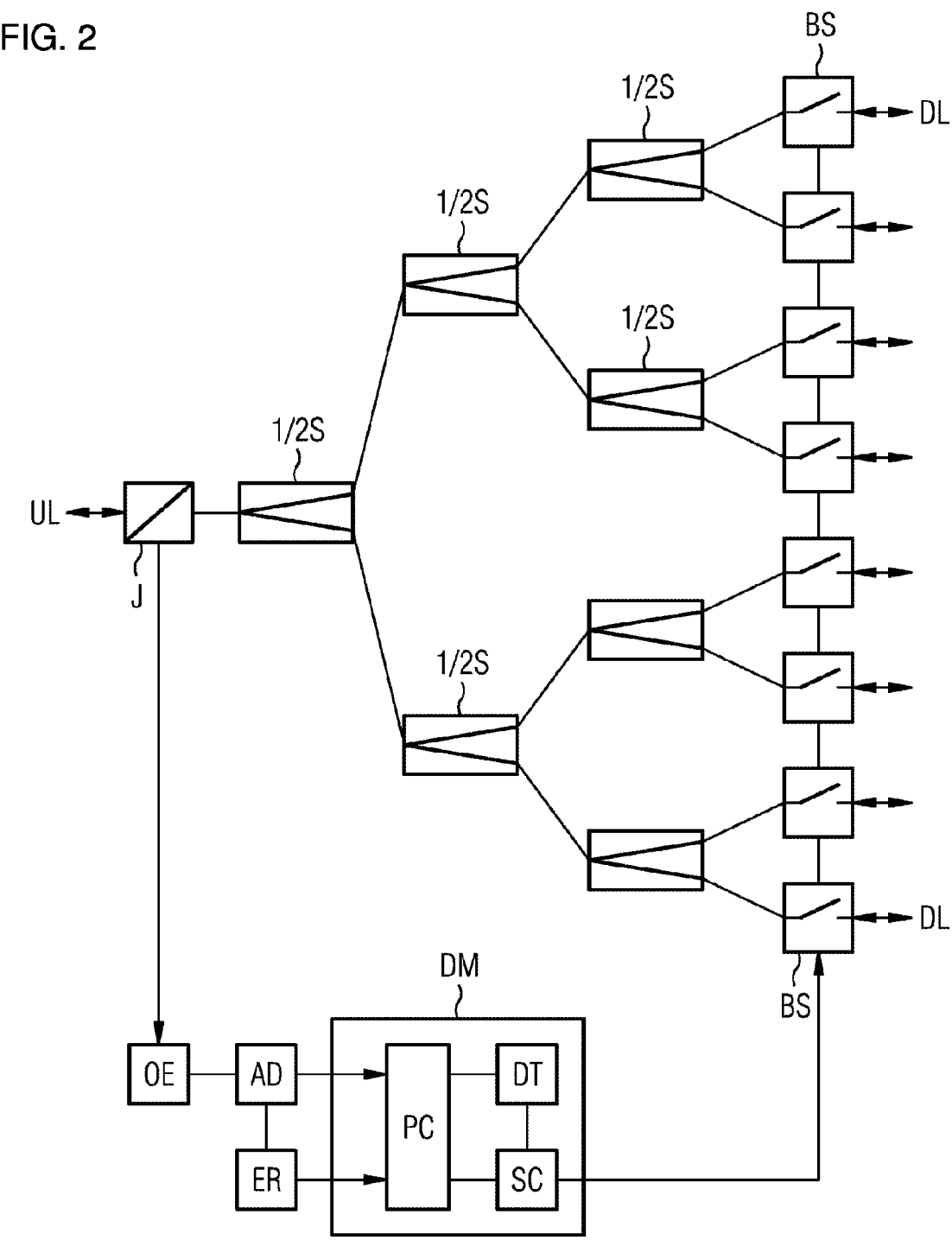
FIG. 2 shows a block diagram of a splitter.

In FIG. 2 a block diagram of a splitter SP is shown. In this example one upstream line UL is splitted into eight downstream lines DL. Also the upstream signals on the downstream lines DL are combined onto one upstream line UL. This is achieved by optical splitting and combining elements 1/2S, which are cascaded here in three stages.

Each downstream line DL may be equipped with a bistable switch BS, which can sever or reconnect the optical line to the splitter. These bistable switches BS may be controlled by the switch control unit SC, which is part of the data signal processing module DM.

The power signal may be extracted from the upstream line UL by the junction J and passed to the optical electrical converter OE, which feeds the power to a passive AC/DC-splitter AD. The DC component of the power signal may energise the energy reservoir ER. The AC component is delivered to the power level controller PC and further to the data transmission circuit DT. This circuit may analyse the data signal and pass the commands from the OLT to the switch control circuit SC.

The power level controller may monitor the activity on the data signal and when there is no activity, it may power down the data transmission circuit and the switch control circuit. As the bistable switches consume no power as long as they are not toggled, the overall power consumption of the splitter is minimized.

REFERENCES

AD AC/DC Splitter
BS Bistable Switch
CO Control System
DL Downstream Line
DM Data Transmission Processing Module
DS Data signal
DT Data Transmission Circuit
ER Energy Reservoir
J Optical Junction
OE Optical Electrical Converter
OLT Optical Line Terminal
ONU Optical Network Unit
PC Power level control circuit
SC Switch Control Circuit
SP Optical Splitter
UL Upstream Line
1/2S 1 to 2 Splitter and Combiner
$\lambda d$ Wavelength Downstream signal
$\lambda p$ Wavelength Power signal
$\lambda u$ Wavelength Upstream signal

The invention claimed is:
1. An optical splitter for a passive optical network for telecommunication signal transmission with an optical line terminal, comprising:
  a wavelength-selective optical electrical converter;
  an AC/DC splitter connected to said converter;
  an energy reservoir connected to said AC/DC splitter;
  a data transmission processing module; and
  a plurality of optical switches connected to and controlled by said data transmission processing module in accordance with data signals transmitted from the optical line terminal.
2. The optical splitter according to claim 1, wherein said optical electrical converter and said AC/DC splitter convert a predefined optical power signal into an electrical signal, which energizes said energy reservoir and said data transmission processing module.

3. The optical splitter according to claim 2, wherein said data transmission processing module includes a switch control circuitry and a power level control circuitry for monitoring the data from the optical line terminal and for powering down said switch control circuitry if no data signals are present at the optical line terminal.

4. The optical splitter according to claim 1, wherein said energy reservoir is a battery pack or a capacitor array.

5. The optical splitter according to claim 1, wherein said AC/DC splitter is connected to deliver the data signals to said data transmission processing module.

6. The optical splitter according to claim 1, wherein said optical switches are bistable switches that consume energy only during a switching process.

7. The optical splitter according to claim 6, wherein said optical switches are MEMS technology switches with mirrors or diffractive stripes.

8. The optical splitter according to claim 6, wherein said optical switches are liquid crystals.

9. A method of severing and reconnecting optical lines to an optical splitter, comprising:
   providing an optical splitter for a passive optical network for telecommunication signal transmission, including:
   a wavelength-selective optical electrical converter;
   an AC/DC splitter connected to said converter;
   an energy reservoir connected to said AC/DC splitter;
   a data transmission processing module; and
   a plurality of optical switches connected to and controlled by said data transmission processing module in accordance with data signals transmitted from the optical line terminal;
   receiving at the optical splitter an optical power signal sent with a wavelength outside a range of a telecommunication signal transmission from an optical line terminal to the optical splitter;
   energizing in the optical splitter, electronic circuitry;
   whereby the optical power signal carries data signals from the optical line terminal to the optical splitter, by which the optical switches can be switched to selectively sever or reconnect the optical lines.

10. The method according to claim 9, further comprising the steps of:
   monitoring the signal from the splitter; and
   in a faulty condition of the signal, severing and reconnecting the optical lines to the splitter while a faulty optical line is detected.

11. The method according to claim 9, further comprising the step of transmitting a data signal with a long preamble phase to wake up the switch control circuitry.

12. The method according to claim 9, wherein the power signal has a wavelength of 850 nm.

13. The method according to claim 9, further comprising the step of exchanging a defective optical network unit if a defective optical network unit is detected.

* * * * *